Figure 1:
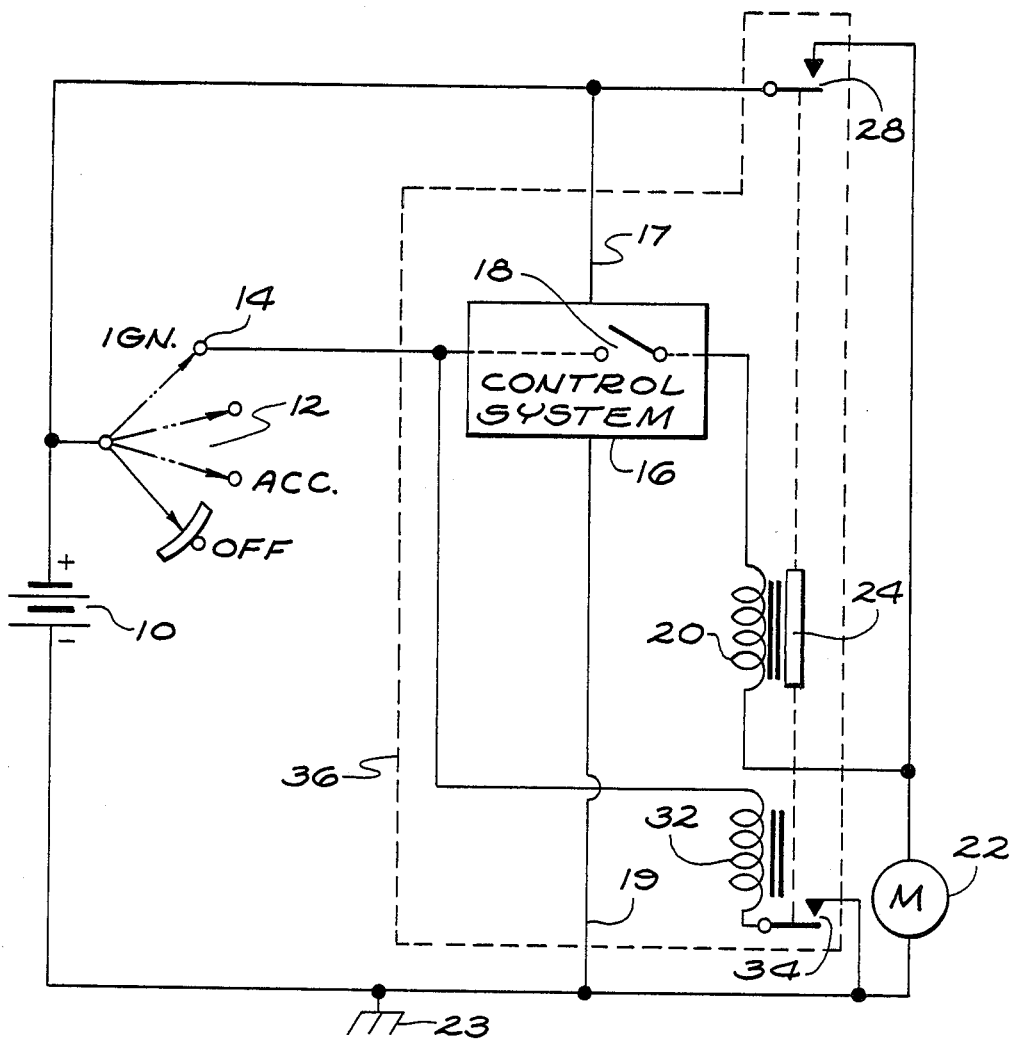

United States Patent [19]

Branco

[11] Patent Number: 4,739,736
[45] Date of Patent: Apr. 26, 1988

[54] ANTITHEFT SYSTEM FOR STARTING A VEHICLE

[75] Inventor: Flavio S. C. Branco, Northridge, Calif.

[73] Assignee: Marvin Retsky, Beverly Hills, Calif.

[21] Appl. No.: 922,297

[22] Filed: Oct. 23, 1986

[51] Int. Cl.⁴ ............... B60R 25/00; F02N 11/08; F02N 11/10
[52] U.S. Cl. ............... 123/179 B; 123/179 M; 180/287; 307/10 AT; 290/38 R
[58] Field of Search ....... 123/179 B, 179 BG, 179 M, 123/198 B; 180/287; 307/10 AT; 290/38 R, 38 C

[56] References Cited

U.S. PATENT DOCUMENTS 3,609,383 9/1971 Welsh .................. 290/38 R
4,533,016 8/1985 Betton .................. 180/287
4,551,630 11/1985 Stahura et al. .......... 290/38 R

*Primary Examiner*—Andrew M. Dolinar
*Assistant Examiner*—M. Macy
*Attorney, Agent, or Firm*—Ellsworth R. Roston; Charles H. Schwartz

[57] ABSTRACT

A system for energizing a motor vehicle engine includes an energy source (e.g. a battery), an ignition switch, a pinion, a motor, a pull-in coil, a holding coil and a magnetizable core movable upon the energizing of the pull-in coil. The pull-in coil, the holding coil and the core are disposed within a housing. The system also includes first and second switches each disposed within the housing and closed upon the movement of the core. The system further includes a control system disposed within the housing and operable when the ignition switch has been closed in a particular sequence such as that produced by short intervals between first closings and pauses between other closings. When the control system is operated, current flows through the pull-in coil, causing the core to be moved to a position closing the first and second switches and moving the pinion to a position coupling the engine to the motor. The closure of the first switch connects the energy source directly to the motor. The closure of the second switch causes a circuit to be established from the energy source to the holding coil. By including the second switch, the system cannot be circumvented by increasing the voltage on the holding coil in an effort to make the holding coil perform the function of the pull-in coil-namely, moving the core.

32 Claims, 1 Drawing Sheet

ANTITHEFT SYSTEM FOR STARTING A VEHICLE

This invention relates to a system for starting a vehicle such as an automobile. More particularly, the invention relates to a system for preventing unauthorized persons from starting the vehicle. In this way, the system provides for the vehicle to be started only by an authorized person.

Systems have been in use for many years to start vehicles such as automobiles by turning an ignition key to a start position. When the ignition key is turned to the start position, a solenoid is energized to move a pinion to a position for coupling the electrical motor to the vehicle engine and, at the same time, close a switch which energizes the motor. This turns the vehicle engine and enables starting of the engine.

The systems now in use for starting vehicle engines are advantageous in that they generally operate reliably. However, the systems are disadvantageous from the stand point that a person intent on stealing the vehicle can easily override the ignition system to start the vehicle without using an ignition key to close the ignition switch. For example, the ignition system can generally be overridden by connecting a wire from the battery to a strategic position in the ignition system. This is colloquially designated as hot wiring. In large cities, the theft of automobiles is now quite common.

In view of the serious problem which has existed for a number of years in the theft of vehicles such as automobiles, a considerable effort has been made, and considerable moneys have been expanded, to develop improved ignition systems which will foil attempts by thieves to steal the vehicles. Such attempts have been at best partially successful. Although various systems are now in use for preventing theft, such systems have not been effective. For example, various systems now exist to provide for the generation by the vehicle of loud and unpleasant noises when a vehicle is being entered against an owner's wishes. These systems are ineffective because (1) they malfunction quite often and generate noises without anybody being near the vehicle and (2) the public recognizes such malfunctions and fails to become disturbed when a thief is actually breaking into the vehicle.

U.S. Pat. No. 4,533,016 is assigned of record to an organization of which the assignee of record in this application is a member. U.S. Pat. No. 4,533,016 discloses and claims a system which overcomes most of the disadvantages discussed above. The system includes a starter solenoid which is operative only when the vehicle operator turns the ignition key to the start position a plurality of successive times in a pattern represented by short intervals after first sequences of such turnings and pauses after other sequences of such turnings. The ignition system becomes operative only after the ignition switch has been turned to the start position in the particular sequence discussed above. This sequence can be changed by the operator at any time if he wants to loan the vehicle to third persons on a temporary basis.

The system disclosed and claimed in U.S. Pat. No. 4,533,016 is effective under practically every conceivable circumstance. However, applicant has discovered that the system disclosed and claimed in such patent can be circumvented under certain limited circumstances. Specifically, such assignee has discovered that the system can be defeated by increasing the voltage applied through the battery and the ignition switch to the holding coil in the "start" position of the ignition switch. For example, the system of U.S. Pat. No. 4,533,016 is foolproof when the energy source such as a battery provides an normal voltage of 12 volts. However, the system can be circumvented when an additional battery is included to provide for the introduction of a total of at least 24 volts on the holding coil.

This invention provides a system which is improved over the system of U.S. Pat. No. 4,533,016. The system of this invention is effective in preventing a vehicle from being stolen under all of the different possibilities for which the system of U.S. Pat. No. 4,533,016 is effective. Furthermore, the system of this invention is foolproof even when the voltage from the energy source such as the battery is increased. As a result, a vehicle incorporating the system of this invention can be operated only by a person who knows the sequential code in which the ignition switch is to be turned to the start position.

In one embodiment of the invention, a system for energizing a motor vehicle engine includes an energy source (e.g. a battery), an ignition switch, a pinion, a motor, a pull-in coil, a holding coil and a magnetizable core movable upon the energizing of the pull-in coil. The pull-in coil, the holding coil and the core are disposed within a housing.

The system also includes first and second switches each disposed within the housing and closed upon the movement of the core. The system further includes a control system disposed within the housing and operable when the ignition switch has been closed in a particular sequence such as that produced by short intervals between first closings and pauses between other closings.

When the control system is operated, current flows through the pull-in coil, causing the core to be moved to a position closing the first and second switches and moving the pinion to a position coupling the engine to the motor. The closure of the first switch connects the energy source directly to the motor. The closure of the second switch causes a circuit to be established from the energy source to the holding coil. By including the second switch, the system cannot be circumvented by increasing the voltage applied to the holding coil in an effort to make the holding coil perform the function of the pull-in coil-namely, moving the core.

Figure 2:
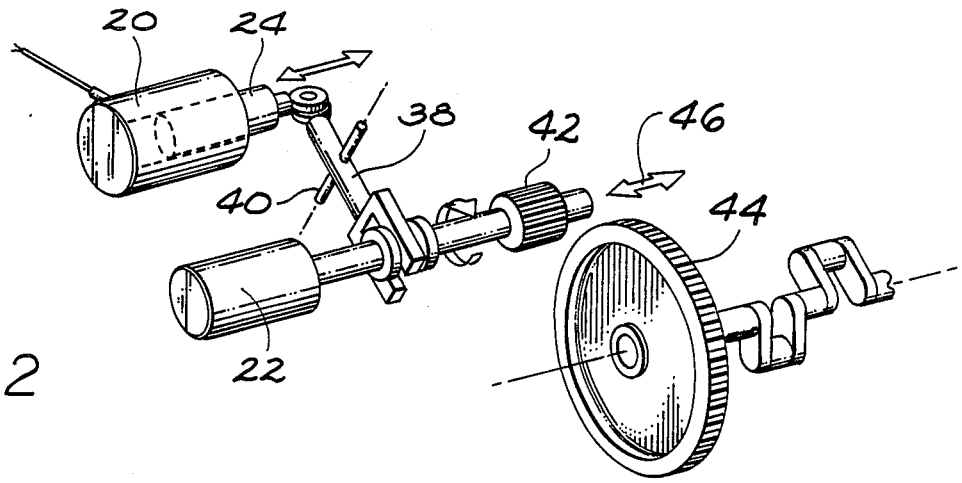

In the drawings:

FIG. 1 is a schematic electrical diagram illustrating one embodiment of a system constituting this invention for providing the starting of a vehicle engine such as in an automobile only by authorized individuals; and FIG. 2 is a perspective view of mechanical components operable to actuate the vehicle engine when the system shown in FIG. 1 is energized.

In one embodiment of the invention, an energy source such as a battery 10 is adapted to provide a suitable voltage such as twelve (12) volts. The battery is connected to the movable arm of an ignition switch 12. The ignition switch 12 has a plurality of successive positions, the last of which constitutes the position for starting the engine. This position is indicated at 14. The terminal 14 is connected to the input of a control system 16 which is shown in block form. The control system includes a normally open switch 18 which may be constructed in a solid state (a semi-conductor) and which is closed when the control system is operated. The control system receives energy from the battery 10 through lines 17 and 19.

The output from the control system 16 is introduced to one terminal of a pull-in coil 20 which is constructed in a conventional manner to provide a relatively low resistance such as approximately three tenths (0.3) of one (1) ohm. A connection is made from the second terminal of the pull-in coil 20 to one terminal of a motor 22, the second terminal of which may receive a reference potential such as a ground 23 from the body of the vehicle. This ground is also applied to the second terminal of the battery 10 and to the line 19.

A magnetizable core 24 is magnetically associated with the pull-in coil 20 so as to move downwardly in FIG. 1 when the pull-in coil 20 is energized. The core 24 is mechanically coupled to a movable arm of a switch 28 having a pair of spaced stationary contacts. One of the spaced stationary contacts of the switch 28 is connected to the ungrounded terminal of the battery 10 and the other spaced stationary contact is connected to the ungrounded terminal of the motor 22. The core 24 is also actuated by a holding coil 32 which is constructed to provide a relatively low resistance such as approximately six tenths (0.6) of one (1) ohm. Connections are made from one terminal of the holding coil 32 to the terminal 14 in the ignition switch 12 and from the other terminal of the holding coil to the movable arm of a swtich 34. The stationary contact of the switch 34 receives the reference potential such as ground. The movable arm of the switch 34 is mechanically coupled to the core 24 to be movable with the core at a position for closing the switch 34.

The control system 16, the pull-in coil 20, the magnetizable core 24, the switch 28, the holding coil 32 and the switch 34 are included within a housing which is illustrated by broken lines at 36. The housing may be electrically connected to one terminal, such as the negative terminal, of the battery 10 to ground this terminal. The housing 36 is constructed to be tamper-proof. By including these members in the housing 36, the difficulties of tampering with the ignition system constituting this invention become considerably increased. All of the components included in the housing 36 except for the switch 34 are disclosed in some detail in U. S. Pat. No. 4,209,709 issued to Arnold L. Betton on June 24, 1980, for an "Anti-Theft Ignition System".

The control system 16 is constructed to become operative only when the movable arm of the ignition switch 12 is positioned to engage the terminal 14 a number of successive times in particular sequence to provide closings of the switch. Each successive closing of the ignition switch 12 causes a pulse to be produced. The sequence of pulses may be considered as defining a plurality of words. The period of time between the closings in each word is relatively short. For example, this relatively short period may be less than one (1) second. The period of time between successive words may be relatively long. For example, the period of time between successive words may be more than one (1) second.

The number of pulses generated in each successive word in the system 16 and the number of successive words generated in the system 16 are monitored by a microprocessor (not shown) in the control system 16. Upon the generation of the proper sequence of words each having a predetermined duration, the switch 18 in the control system 16 is closed. The construction and operation of the system 16 are fully disclosed in U.S. Pat. No. 4,533,016.

When the control system 16 is energized, upon receiving the properly coded pulses, to actuate the switch 18, current flows through a circuit including the battery 10, the ignition switch 12, the control system 16, the switch 18, the pull-in coil 20 and the motor 22. This causes the pull-in coil 20 to become energized to move the core 24 downwardly in FIG. 1 and horizontally in FIG. 2. This causes the lever 38 to be pivoted on the fulcrum 40 and to move the pinion 42 into engagement with the engine flywheel rim gear 44.

During the initial travel of the core 24, the switch 34 is activated to provide for a flow of current through a circuit including the battery 10, the ignition switch 12, the holding coil 32 and the switch 34. The switch 34 remains closed during the remaining travel of the core 24. Near the end of the travel of the core 24, the switch 28 is activated, by-passing the switch 18 and the pull-in coil 20. When activated, the switch 28 also establishes a continuity through the circuit including the battery 10, the switch 28 and the motor 22 and causes the solid state switch 18 to open.

The core 24 is maintained in its fully actuated position by the current flowing through the holding coil 32 as long as the ignition switch 12 is held in the position 14. When the ignition switch 12 is released from the position 14, the current ceases to flow through the holding coil 20. As a result, the core 24 is released to its unactuated position. As the core 24 returns to its unactuated position, it initially releases the movable arm of the switch 28 and the movable arm of the switch 34 so that both switches become opened. When the switches 28 and 34 become opened, the pinion 42 can be actuated to engage the engine flywheel rim gear 44 only by activating the control system 18 by the closure of the ignition switch 12 to generate appropriately coded sequence of pulses.

As will be appreciated, if the control system 16 is not included in the ignition system of FIG. 1, the ignition system can be operated without having to insert the ignition key in the ignition switch. This can be accomplished by connecting a wire between the ungrounded terminal of the battery 10 and the terminal 14. The inclusion of the control system 16 foils any such possibilities.

Without the inclusion of the switch 34, e.g. with the holding coil connected directly to the ground 23, the ignition system can still be operated under certain limited circumstances without any actuation of an ignition key in the ignition switch. This can be specifically accomplished by connecting a second battery in series with the battery 10 and by connecting a wire between the highest potential terminal of the two batteries and the terminal 14 as discussed in the previous paragraph. In this way, the holding coil 32 effectively serves both as a pull-in coil and a holding coil even though it has an impedance greater than that of the pull-in coil 20. The vehicle engine can be started under such circumstances because the increased voltage from the two (2) batteries causes the magnetic field of the holding coil 32 to be as large as the magnetic field of the pull-in coil 20 under normal operating conditions.

As will be seen, the inclusion of the switch 34 in the system of this invention prevents the holding coil 32 from being energized until after the pull-in coil 20 has been energized. Since the pull-in coil 20 can be energized only after the control system 16 has been operated by the generation of the particular sequence of words as disussed above, the starting system of this invention cannot be circumvented by by-passing the ignition switch 12.

The system constituting this invention has certain important advantages over the prior art. These include the following:

(1) As previously described, the system of this invention cannot be circumvented by increasing the voltage from the battery 10.

(2) Since current cannot pass through the holding coil 32 until after the control system 16 has been operated in the particular sequence of words, successive closures of the ignition switch 12 do not result in the flow of current through the holding coil 32 until the control system 16 becomes operative by the generation of the proper sequence of words. The control system 16 includes integrated circuits. These integrated circuits receive temperature increases at the rate of approximately 1° C. per second when current flows through the holding coil 32. At high temperatures the integrated circuits in the control system 16 have a decreased reliability. By preventing the holding coil 32 from receiving any current until the control system 16 has been operated, the temperature of the integrated circuits in the control system is not subjected to any additional temperature increases above the actual temperature of the engine block to which the housing 36 is attached.

(3) Since current does not flow through any components in the system of this invention until after the control system 16 has been operated, the battery 10 cannot become drained by successive closures of the ignition switch 12.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim:

1. In combination for use with an energy source, an ignition switch, a motor and gear means for providing a controlled starting of an engine,
a pull-in coil for operating the gear means, when energized, to couple the motor to the engine,
a holding coil for operating the gear means, when energized, to couple the motor to the engine,
means defining a first normally open switch associated with the pull-in coil and the holding coil for actuating the first switch to the closed position when at least one of the pull-in coil and the holding coil is actuated,
control means defining an electrical circuit with the energy source and the ignition switch and responsive to particular closings of this electrical circuit for energizing the pull-in coil and the motor,
means responsive to the operation of the first switch in the closed state for maintaining an energizing of the motor,
means defining a second normally open switch responsive to energization of the pull-in coil to obtain an operation of the second switch in the closed state, and
means responsive to the closure of the second switch for energizing the holding coil.

2. In a combination as set forth in claim 1,
a housing,
the pull-in coil, the holding coil, the first switch and the second switch being disposed within the housing.

3. In a combination as set forth in claim 1,
a magnetic core associated with the first switch and the second switch and actuated by the energizing of the first switch to close the second switch.

4. In combination for use with an energy source, an ignition switch, a motor and a pinion actuatable from a first position to a second position for providing a controlled starting of an engine in accordance with an energizing of the motor,
first means including a first switch defining a continuous electrical circuit upon a closure of the ignition switch for actuating the pinion to the second position to couple the motor to the engine,
said first normally open switch becoming closed upon the continuity of said electrical circuit to provide for an energizing of the motor upon such closure,
a second normally open switch operable to the closed state only upon closure of said first switch, and
second means operative only upon the operation of the second switch in the closed state for maintaining energization of the motor and actuation of the pinion to the second position to couple the motor to the engine.

5. In a combination as set forth in claim 4,
the first means also including a coil and a magnetic core energizable to actuate the pinion to the second position to couple the motor to the engine.

6. In a combination as set forth in claim 4,
the first means being responsive to successive closures of the ignition switch in a particular pattern for obtaining the energizing of the motor and an actuation of the pinion to the second position to couple the motor to the engine.

7. In a combination as set forth in claim 4,
the second means including a coil energizable to actuate the pinion to the second position to couple the motor to the engine.

8. In a combination as set forth in claim 4,
a housing,
the first means, the first normally open switch, the second normally open switch and the second means being disposed in the housing.

9. In combination for actuating an engine in accordance with an actuation of pinion means coupling a motor to the engine,
an energy source,
a pull-in coil for operating the pinion means, when energized, to couple the motor to the engine,
a holding coil for operating the pinion means, when energized, to couple the motor to the engine,
an ignition switch,
a control system coupled in a circuit with the ignition switch and the energy source and energizable in accordance with a particular pattern of continuity through this circuit,
means including the energy source, the motor, the pull-in coil, the ignition switch and the control system for energizing the pull-in coil and the motor upon the energizing of the control system,
a normally open switch having open and closed states and normally in the opened state and operable in the closed state only upon a flow of current through the pull-in coil, and
means including the holding coil and the normally open switch for energizing the holding coil only upon the operation of the normally open switch in the closed state.

10. In a combination as set forth in claim 9,
a core associated with the pull-in coil and the holding coil and actuatable in accordance with the operation of these coils in the energized state, the core being operatively coupled to the normally open switch to close the switch upon the actuation of the core.

11. In a combination as set forth in claim 9,
a housing,
the pull-in coil, the holding coil, the control system and the normally open switch being disposed in the housing.

12. In a combination as set forth in claim 11,
the control system being operative to produce a control signal upon the closure of the ignition switch in a particular time sequence.

13. In a combination as set forth in claim 11,
a second switch operable in open and closed states and normally operable in the open state and operable in the closed state upon the operation of at least one of the pull-in and holding coils in the energized state and included in a circuit with the energy source and the motor to provide for energizing of the motor upon the closure of the second switch.

14. In combination for use with an energy source, an ignition switch, a motor and pinion means for providing a controlled starting of an engine,
a pull-in coil for positioning the pinion means, when energized, to couple the motor to the engine,
a holding coil for maintaining the the positioning of the pinion means, when energized, to couple the motor to the engine,
a housing which encloses the pull-in coil and the holding coil,
control means disposed within the housing in a circuit with the energy source and the ignition switch and responsive to a particular sequence of continuities through this circuit for applying energy from the energy source to the pull-in coil to obtain the positioning of the pinion means to couple the motor to the engine and for applying energy to the motor, and
means disposed within the housing and responsive only to the operation of the pull-in coil in the energized state for applying energy from the energy source to the holding coil to obtain the positioning of the pinion means to couple the motor to the engine.

15. In a combination as set forth in claim 14,
a core normally disposed in a first position and movable to a second position upon the operation of the pull-in coil in the energized state, and
the means fopr applying energy to the holding coil being operable only upon the movement of the core to the second position.

16. In a combination as set forth in claim 14,
the last mentioned means including a normally open switch closed upon the application of energy to the pull-in coil.

17. In combination as set forth in claim 15,
the means for applying energy to the holding coil including a normally open switch closed upon the movement of the core.

18. In combination for use with a battery in starting a motor vehicle engine and for precluding the engine from being started by unauthorized persons, the combination comprising:
a holding coil, a pull-in coil and a core, the holding coil and the pull-in coil being individually energizable upon a flow of current through such coil, and the core being normally disposed in a first position and being movable to a second position in accordance with the energizing of at least one of the pull-in coil and the holding coil;
a housing which encloses the holding coil, the pull-in coil and the movable core;
an ignition switch;
terminal means for connecting the housing to the battery and the ignition switch; and
control means disposed within the housing and connected in a circuit with the battery and the ignition switch and responsive to a predetermined series of continuities through this circuit for selectively applying current to said pull-in coil to energize the pull-in core and for starting the engine only when the continuity has been established through the circuit in the predetermined series; and
means for providing for the flow of current through said holding coil to energize the holding coil only after current has been applied to the pull-in coil to energize the pull-in coil.

19. The combination according to claim 18 wherein said means for providing for the flow of current through the holding coil to energize the holding coil includes a control switch which has open and closed states and which is normally operative in the open state and which is operative in the closed state only after the flow of current through the pull-in coil.

20. The combination according to claim 18 wherein said switch connects said terminal means to said holding coil.

21. The combination according to claim 19, wherein said control switch is magnetically response to the energizing of the pull-in coil and the movement of the core to the second position.

22. The combination according to claim 19, further comprising means for completing a circuit between said battery and an automobile starting motor in accordance with the movement of the core to the second position.

23. The combination according to claim 18, wherein said means for providing application of current to said holding coil comprises a control switch with normally open contacts in series with said holding coil and said terminal.

24. The combination according to claim 23, further comprising means for coupling said control switch to said core; and
means for closing said contacts when said core is actuated.

25. The combination according to claim 24, wherein said contact closing means is responsive to the operation of said pull-in coil in the energized state.

26. In combination for use with a battery in starting a motor vehicle engine and for precluding the engine from being started by unauthorized persons, the combination comprising:
a holding coil, a pull-in coil and a core, each of the holding coil and the pull-in coil being energized by a flow of current through such coil and the core being normally disposed in a first position and being actuatable to a second position upon an energizing of at least one of the pull-in coil and the holding coil;

a housing which encloses the holding coil, the pull-in coil and the movable core;
an ignition switch;
terminal means for connecting the housing to the battery and ignition switch;
control means disposed within the housing and connected in a circuit with the battery and the ignition switch and responsive to a predetermined series of continuities through this circuit for selectively producing a flow of current through the pull-in coil to energize the pull-in coil and for starting the engine only when the continuity has been established in the predetermined series; and
means for providing a flow of current through the holding coil to energize the holding coil only when said core is actuated to the second position 27. The combination according to claim 26, wherein said means for providing for the flow of current through said holding coil includes a control switch with normally open contacts in series with said holding coil and said terminal means, the control switch being associated with the core to become closed upon the actuation of the core to the second position.

28. The combination according to claim 27, further comprising means for coupling said control switch to said core; and
means for closing said contacts of said control switch when said core is actuated to the second position.

29. The combination according to claim 28, wherein said contacts of the control switch are responsive to become closed upon energization of said pull-in coil.

30. The combination according to claim 27, further comprising a motor for starting the engine and means for completing a circuit between said battery and the motor upon the actuation of the core to the second position.

31. In combination for use with an energy source, in ignition switch, a motor and a pinion for coupling the motor to an engine to provide a controlled starting of the engine in accordance with the energizing of the motor,
first and second normally open switches,
core means normally disposed in a first position and movable to a second position to close the first and second normally open switches and to operate the pinion means for coupling the motor to the engine to start the engine,
a pull-in coil for moving the core means to the second position when energized,
a holding coil for maintaining, when energized, the position of the core means in the second position of the core means,
control means connected in a circuit with the energy source and the ignition switch and responsive to particular continuities through this circuit for obtaining an energizing of the pull-in coil and the motor and a closure of the first and second normally open switches,
means responsive to the closure of the second normally open switch for obtaining an energizing of the holding coil, and
means responsive to the closure of the first normally open switch for obtaining an energizing of the motor.

32. In a combination as set forth in claim 31,
a housing,
the pull-in coil, the holding coil, the control means, the first switch and the second switch being disposed within the housing.

* * * * *